C. R. TRAXLER.
TRACTION WHEEL.
APPLICATION FILED DEC. 1, 1909.
1,004,313.
Patented Sept. 26, 1911.
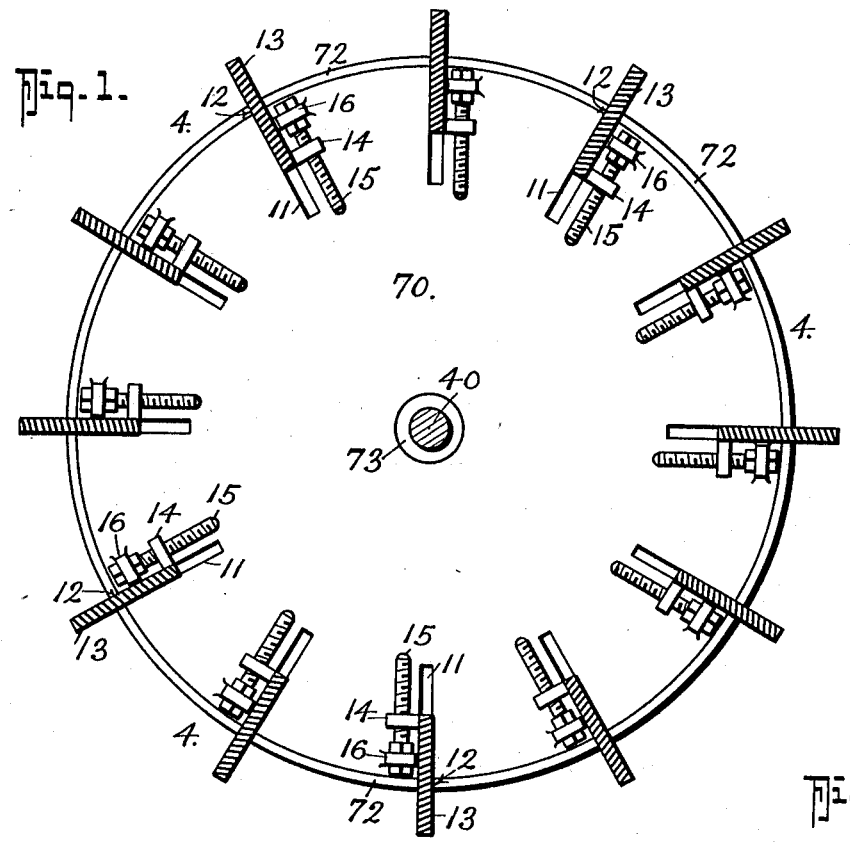
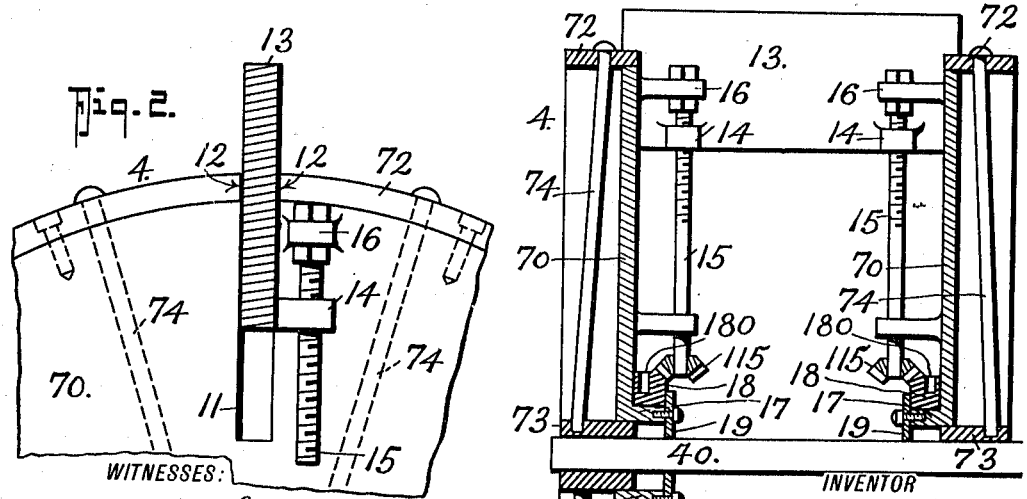
WITNESSES:
John T. Schrott.
Charles H. Wagner.
INVENTOR
Cisco R. Traxler
BY
Fred G. Dieterich
ATTORNEYS.

UNITED STATES PATENT OFFICE.

CISCO R. TRAXLER, OF WINSTON SALEM, NORTH CAROLINA, ASSIGNOR TO AMERICAN FARM TRACTOR CO., OF NEW YORK, N. Y., A CORPORATION OF DELAWARE.

TRACTION-WHEEL.

1,004,313.     Specification of Letters Patent.     Patented Sept. 26, 1911.

Application filed December 1, 1909. Serial No. 530,732.

*To all whom it may concern:*

Be it known that I, CISCO R. TRAXLER, residing at Winston Salem, in the county of Forsyth and State of North Carolina, have invented a new and Improved Traction-Wheel, of which the following is a specification.

This invention is an improved traction wheel for use in motor driven tractors and the invention consists in providing a traction wheel composed of two sub-wheels on a common shaft spaced apart and connected by radial blades which have radial movements and are adjusted by means of screw threaded devices.

In its still more subordinate features, my invention consists in certain details of construction and peculiar combination of parts, all of which will be hereinafter fully explained, specifically pointed out in the appended claims and illustrated in the accompanying drawings, in which:

Figure 1, is a vertical, longitudinal section of the traction wheel. Fig. 2, is a detail view that shows a way to readily adjust the movable blades singly, and Fig. 3, is a view that shows a means for shifting all of the blades.

In the drawings, like numerals and letters of reference indicate like parts in all of the figures.

40 is the shaft on which the hubs 73 of the wheel sections 4 are secured. Each wheel section 4 includes a hub 73 and a rim 72 joined by spokes 74. The wheel sections 4 are placed apart and are fitted with disks 70 on their inner sides, the disks 70 being secured to the rims 72 by lag screws as indicated in Fig. 2 or in any other desired way. The rims 72 on their inner sides are radially slotted at 12 and the disks 70 are correspondingly slotted at 11.

Fitted in the slots 12—11 and projecting between the two wheel sections 4 are the radially adjustable blades, or lags 13, which have lugs 14 into which the screws 15 are threaded, the screws 15 passing through lugs 16 on the disks 70. The screws 15 swivel in the lugs 16 but do not move longitudinally therethrough.

In the forms shown in Figs. 1 and 2 the blades or lags 13 are individually adjustable while in the form shown in Fig. 3, the lags or blades 13 are simultaneously adjustable. This is accomplished by providing the screws 15 with pinions 115 that mesh with gears 18 on the hubs 17 on the disks 70, the gears 18 being turnable on such hubs by inserting a spanner wrench or lever in the sockets 80 and turning the same.

The gears 18 are held on the hubs 17 by cap plates 19 as shown.

I claim—

1. A traction wheel consisting of a pair of disks spaced apart, radially adjustable cross blades having their ends mounted in said disks, and means on each disk for simultaneously adjusting the corresponding ends of all of the blades.

2. A traction wheel composed of a pair of wheel sections each including a hub, a rim and spokes connecting the hub and rim, and each including a disk mounted between the hub and rim, said rims and said disks having radial slots, blades mounted with their ends in said slots and means for radially adjusting said blades.

3. A traction wheel composed of a shaft, a pair of wheel sections each including a hub, a rim and spokes connecting the hub and rim, and each including a disk mounted between the hub and rim, said rims and said disks having radial slots, blades mounted with their ends in said slots and means operated from adjacent to the hub of each wheel section for simultaneously adjusting the corresponding ends of all of said blades.

CISCO R. TRAXLER.

Witnesses:
    FRED G. DIETERICH,
    ALBERT E. DIETERICH.

---

Copies of this patent may be obtained for five cents each, by addressing the "Commissioner of Patents, Washington, D. C."